United States Patent Office 3,325,729
Patented June 13, 1967

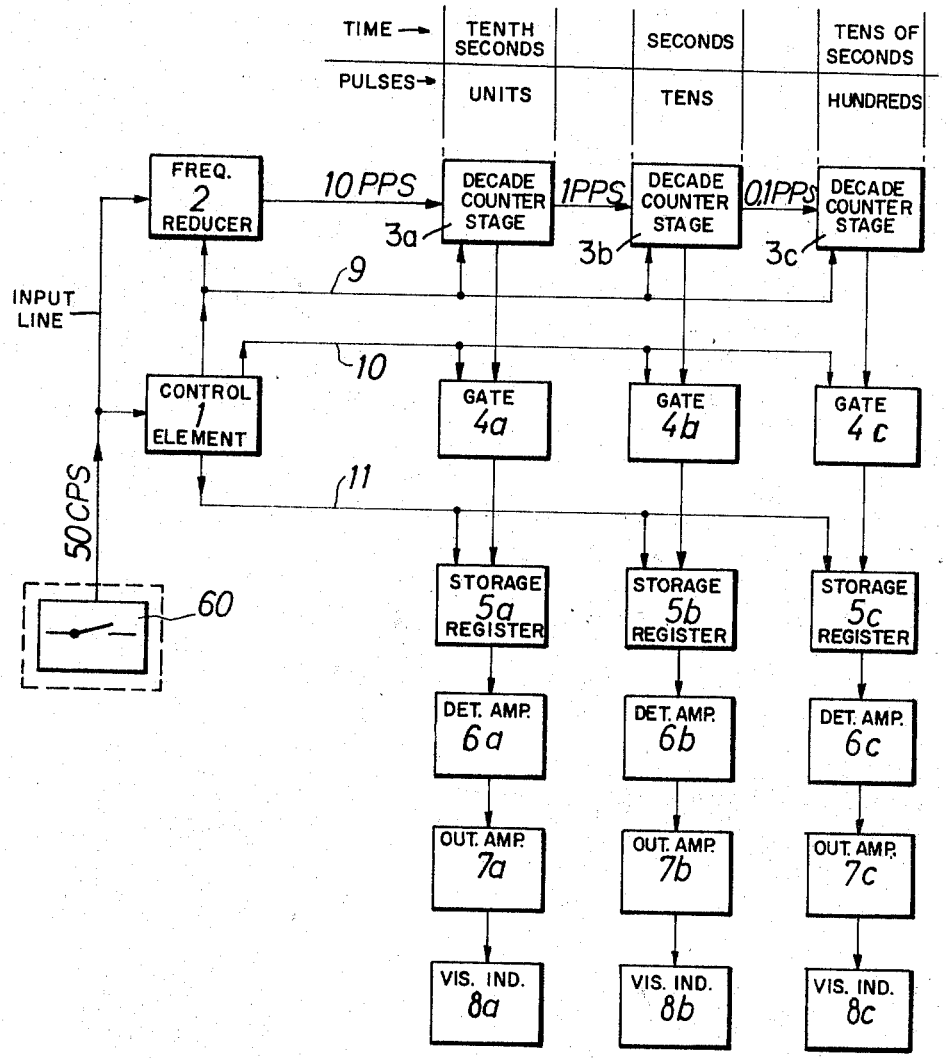

3,325,729
INTERVAL TIMER APPARATUS
Bernhard Vinzelberg, Kurt Dryczynski, Günther Koepke, and Stephan Platz, Leverkusen, and Werner Lessnig, Cologne-Flittard, Germany, assignors to Farbenfabriken Bayer Aktiengesellschaft, Luverkusen, Germany, a corporation of Germany
Filed July 26, 1963, Ser. No. 297,915
Claims priority, appplication Germany, Aug. 30, 1962, F 37,695
4 Claims. (Cl. 324—68)

The present invention relates to an interval timer apparatus which is suitable for general use in measuring the time durations between physically sensible events, but which is particularly suited for measuring the outflow times required to discharge various samples of liquid from a capillary viscometer. A typical industrial vicometer suitable for use with the apparatus of the invention is described in U.S. Patent No. 3,283,565, which was formerly copending application Ser. No. 281,415, filed May 20, 1963. Such viscometer is capable of automatically measuring the viscosity of electrically conductive liquids, especially photographic emulsions, and provides a triple electrode probe for sensing the discharge of a predetermined volume sample of liquid from a measuring vessel. A short, substantially cylindrical measuring vessel is employed with capillary tubes arranged below the vessel, through which the emulsion flows out freely during the measuring time, together with an automatic electrical sequence control, by which the measuring vessel is immersed into the emulsion, the emulsion is absorbed into the measuring vessel through the capillaries, and after filling, the vessel is raised out of the emulsion to such an extent that a constant volume can flow freely out of the capillaries which are now free, the time required for the outflow being measured either as an analogue value by means of a synchronous motor and a primary potentiometer connected thereto, or as a digital value by means of a synchronous motor with a revolution counter connected in series, the speeds of the synchronous motor being such that the measured value is indicated in sec. and 1/10 sec.

This digital measured value storage and indication requires a number of mechanically actuated components subject to wear, which require continuous maintenance, especially in a continuous 24-hour operation.

A further drawback of such arrangements is that the measured value has to be read within a relatively short time, since the revolution counter has to be reset to zero in good time for the next reading.

In contrast, the measurement of liquid outflow time interval for each sample, and the storage of measured time interval data is effected in accordance with the invention by subdividing a typical 50 c./s. electrical timing standard or clocking signal, applied to an input line concurrently with the outflow interval, into train of electrical pulses having a repetition frequency of 10 pulses per second. Subdivision of the 50 c./s. timing standard signal having a frequency division factor of 5, and the counting of the number of pulses in each pulse train is effected by a conventional electronic pulse counter. The frequency division factor is thus chosen so that for whatever timing standard frequency used, the pulses are generated at a repetition rate which is an integral power of ten.

For example, each timing signal cycle or period at a 50 c./s. frequency corresponds to a time duration of 0.02 second, and an interval of 3 seconds would be equivalent to 150 timing signal periods. Thus, the numerical count of timing signal periods does not directly represent in decimal form, the actual 3 second interval duration. By frequency dividing the 50 c./s. timing signal by a factor of 5, the pulse train output from the frequency divider is at a 10 p.p.s. rate, so that each pulse is equivalent to 0.1 second time duration. Consequently, the same 3 second interval would correspond to a pulse train count of 30 pulses, a feature of the invention which allows decade type digital counters, storage registers and display devices to be used for direct read-out of measured interval times, since in the example only a decimal point shifting is involved to convert from the pulse train count to the actual time value in seconds. After termination of the measurement of the outflow-time, the digital value accrued in the impulse counter is taken over automatically by an electronic storage device through a gate circuit, the impulse counter reset to zero after the take-over in preparation for the next count and the measured value taken over by the measured-value storage is preserved until a new value is received by the impulse counter. Output amplifiers are connected to the measured-value storage elements through detection amplifiers, the output amplifiers providing the necessary current for visual indication.

An example of one embodiment of the invention is illustrated in the drawing by way of a block diagram.

The appartus consists of a control element 1, a frequency divider 2, three-stage decade impulse counters 3a, b and c, of the three-stage decade measured-value storage elements 5a, b and c with co-ordinated gate circuit groups 4a, b and c and detection amplifiers 6a, b and c as well as output amplifiers 7a, b and c with the visual indicator decades 8a, b and c. All constituting units are constructed to be contact-less, by the use of electronic components and groups.

The task of the frequency divider 2 is to reduce the 50 c./s. measuring frequency to 10 c./s. This is effected for example by means of a decatron tube or a ring counter, the 0 and 5 counting electrodes act on the 1st decade of the following impulse counter 3a, b and c.

For counting decades there may be employed known decadic ring counters or similar apparatus. In the example here given, the counting decades 3a, b and c are constituted by decatron tubes. The impulse counter is reset to zero by switching a negative impulse on to the zero electrodes of the decatron tubes. To effect this, all 0 counting electrodes are connected to a common zero adjusting control circuit 9 through components not shown. The zero-adjusting control signal is given as the last signal by the control element 1 during the process occurring after the termination of each measurement. The required impulse can be produced by a transistor or a thyratron for example.

The gate circuit groups 4a, b and c have the task firstly of correcting (line 10) the measured value accrued in the impulse counters 3a, b and c and to transfer it to the measured-value storage 5a, b and c; secondly, the gate circuits 4a, b and c must prevent during continuous counting, the passing of signals from the impulse counter to the measured-value storage. The preceding measured value present in the measured-value storage is released via line 11 after termination of the counting by a control signal from the control element 1. A subsequent control signal opens briefly the switching transistor for the take-over of the measured value, whereby the measured value accrued in the impulse counter is collected and taken over by the measured-value storage.

The measured value stored passes from the storage 5a, b and c, through the detection amplifier 6a, b and c directly to the corresponding output amplifiers 7a, b and c. The latter operate as electronic switches and are equipped for example with output transistors, in the collector lines of which the incandescent lamps of the decadic visual indicator 8a, b and c are placed.

The counting-, storing and indicator apparatus according to the invention operates without mechanically actuated components and requires periodical maintenance only. As can be appreciated from the foregoing description, the purpose of the invention is to measure time intervals of various durations, up to 100 seconds each for the three-stage decade counter arrangement specifically described therein. These time intervals to be measured can in general occur in a sequence of an indefinite number of intervals. The interval time measuring apparatus of the invention is predicated upon the fact that concurrently with each time interval there is a 50 c.p.s. electrical signal which is available. This signal can be regarded conveniently as being delivered through a switching type device 60 which operates in synchronism with the interval to be timed. At the commencement of each interval, the switching device 60 closes to deliver the 50 c.p.s. signal over the input line to the control element 1 and frequency reducer 2, and at the termination of each interval and up to the commencement of the next interval, the switching device 60 opens to interrupt the 50 c.p.s. signal on the input line. Thus, where the 50 c.p.s. signal is sensed immediately prior to its interruption, it is indicated that one interval has concluded, and sensing the signal again after such interruption indicates that the succeeding interval has commenced. This information as to the beginning and termination of each interval to be measured is utilized according to the invention to control the operation of a three-stage decade counter 3a–c, gating circuitry 4a–c, and storage registers 5a–c to the end that the visual indicators 8a–c display the time duration of the last measured interval, even while the next later interval is being measured by pulse counting in the three-stage decade counter 3a–c.

With a three-stage decade counter 3a–c, it is possible to count up to a total of 1000 pulses before the individual stages 3a, 3b, 3c, of the counter must be reset. By using a pulse rate which is a power of 10, such as 10 p.p.s., 100 p.p.s., 1000 p.p.s., etc., it is possible to get a direct reading digital output which represents the numerical value of the interval time measured expressed in the decimal number system. For example, where the 50 c.p.s. electrical signal is converted into a 10 p.p.s. signal by the frequency reducer 2, which in effect generates one pulse for every five cycles of the electrical signal, a count of 543 total pulses indicates that the interval just measured was 54.3 seconds long, since each pulse corresponds to a time length of 0.1 second.

It should be noted that the foregoing frequency division factor of five for the case of a 50 c.p.s. electrical signal, which is the standard power frequency available throughout Europe, is replaced by a frequency division factor of six where a 60 c.p.s. standard U.S. power frequency electrical signal is used. This involves no more than using a frequency reducer 2 which generates a pulse on every sixth cycle of the electrical signal rather than on every fifth cycle as in the case of a 50 c.p.s. electrical signal.

We claim:

1. An interval timer apparatus for measuring the duration of intervals, which comprises means for applying to an input line, concurrently with each interval to be measured, a periodic electrical timing standard signal of fixed repetition frequency, a frequency division circuit means coupled to said input line and responsive to said timing standard signal applied thereto to generate a train of electrical pulses concurrently and synchronized therewith, each pulse corresponding to a number of timing standard signal periods equal to the frequency division factor of said frequency division circuit means and hence to a time duration equivalent to such number of timing standard signal periods, said frequency division circuit means having a frequency division factor selected in relation to the frequency of said timing standard signal to generate said pulses at a repetition rate which is an integral power of ten whereby the total number of pulses generated throuhout each interval to be measured directly represents the duration of such interval in time units as expressed numerically in the decimal number system, a multi-stage decade counter circuit means coupled to said frequency division circuit means to count the pulses in each pulse train generated thereby, a multi-stage decade storage register circuit means for storing the pulse counts of said decade counter circuit means, a multi-stage digital display means coupled to said storage register circuit means for displaying the stored pulse count thereof in decimal form, and gating circuit means coupled to said input line for sensing the presence of said timing standard signal applied thereto and the interruption of the application of said signal, said gating circuit means being coupled to the decade counter circuit means and to the storage register circuit means to transfer from said decade counter circuit means to the storage register circuit means the pulse count corresponding to each measured interval at the termination thereof as signified by the interruption of said signal on the input line, said gating circuit means being responsive to the presence of said signal on the input line to inhibit the transfer of incomplete pulse counts to the storage register circuit means during such intervals as signified by the presence of said signal on the input line, whereby the stored pulse count in said storage register circuit means and displayed in decimal form by said digital display means corresponds to the time duration of the last-measured interval.

2. The interval timer apparatus according to claim 1 wherein said gating circuit means is responsive to the interruption of said electrical signal to reset the storage register circuit means for storing the pulse count representing an interval just measured, and to reset the decade counter circuit means for counting pulses corresponding to a following interval, after the storage register circuit means has been reset and the pulse count of the interval just measured has been stored therein, whereby the time duration of the interval just measured is displayed in decimal form by the digital display means while pulses associated with the following interval are being counted by the decade counter circuit means.

3. The interval timer apparatus according to claim 2 wherein the intervals to be measured are represented by an electrical signal having a constant frequency which is an integral multiple of ten cycles per second, and wherein said frequency division circuit means includes circuit components arranged to generate pulse trains having a constant repetition rate of 10 pulses per second for measuring each interval to a precision of 0.1 second.

4. The interval timer apparatus according to claim 3 wherein said multi-stage decade counter circuit means and the multi-stage storage register have the same number of stages, and wherein said gating circuit means includes a gating circuit coupled to each stage of the decade counter circiut means and coupled to a corresponding stage of the storage register circuit means for transferring the pulse count accumulated in said decade counter stages to corresponding storage register stages at the termination of each measured interval and for inhibiting such pulse count transfers during such intervals.

References Cited

UNITED STATES PATENTS 2,566,078   8/1951   Bliss _____ 324—68

RUDOLPH V. ROLINEC, *Primary Examiner.*

WALTER L. CARLSON, *Examiner.*

M. J. LYNCH, *Assistant Examiner.*